March 26, 1957  F. B. ROMERO  2,786,647
STEAM TURBINES
Filed Aug. 23, 1951  6 Sheets-Sheet 1
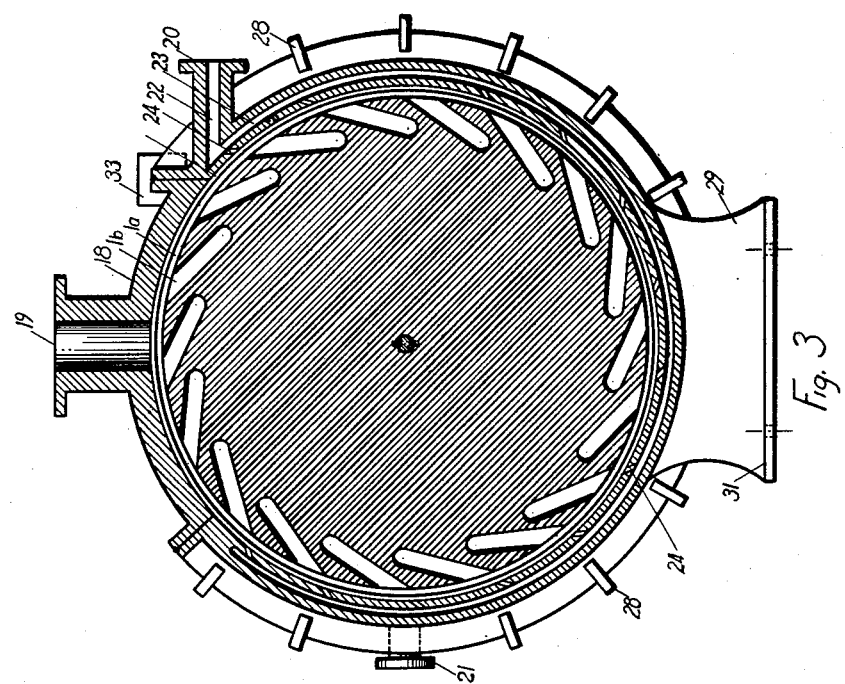
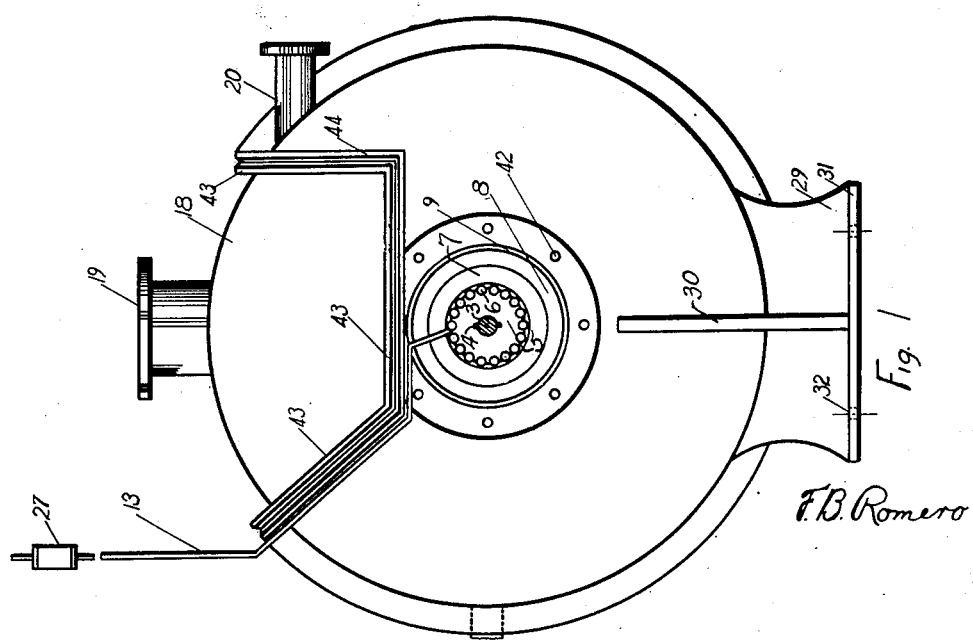
F. B. Romero March 26, 1957 F. B. ROMERO 2,786,647
STEAM TURBINES
Filed Aug. 23, 1951 6 Sheets-Sheet 3

F. B. Romero

United States Patent Office 2,786,647
Patented Mar. 26, 1957

2,786,647

STEAM TURBINES

Frederick B. Romero, Washington, D. C.

Application August 23, 1951, Serial No. 243,205

2 Claims. (Cl. 253—51)

My invention, as herein disclosed, relates to a steam turbine and is for the purpose of having a steam turbine of unusually compact structure with comparatively great power and speeding possibilities to drive new types of high speed marine vessels and simultaneously to run electric generators supplying electricity to heat new types of U-boilers revealed in application of Ser. No. 275,813, filed March 10, 1952, now Patent No. 2,707,423, and to adequately light the said new types of marine vessels of Patent No. 2,550,296, April 24, 1951, and of application of Ser. No. 775,442, filed September 22, 1947, and now patented under Patent No. 2,570,595, October 9, 1951, and to drive a newly invented marine propulsion chain of Patent No. 2,539,756, January 30, 1951, in a newly invented chain propelled vessel of Ser. No. 162,523, filed May 17, 1950, now abandoned. A further object of this invention is to improve this type of steam turbine, which is revealed in the several accompanying drawings, in which the different parts are identified by numerals, and similar numerals refer to similar parts throughout the several views, but not all the similar parts in all the views are numbered. The invention is revealed in the drawings which include the following figures.

Fig. 1 is a front elevation view of the turbine.

Fig. 3 is an elevation sagittal sectional view.

Figure 5:
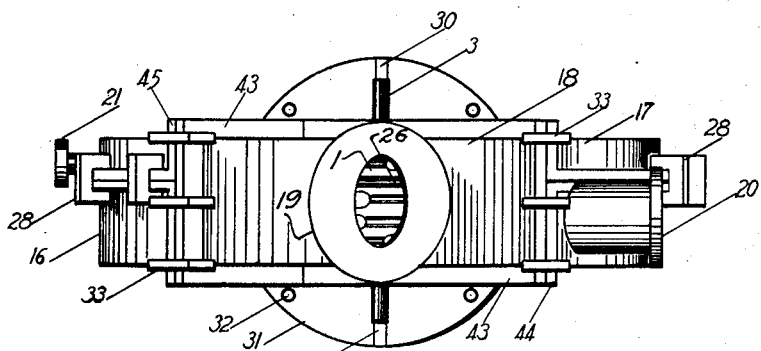
Fig. 5 is a top view.
Figure 2:
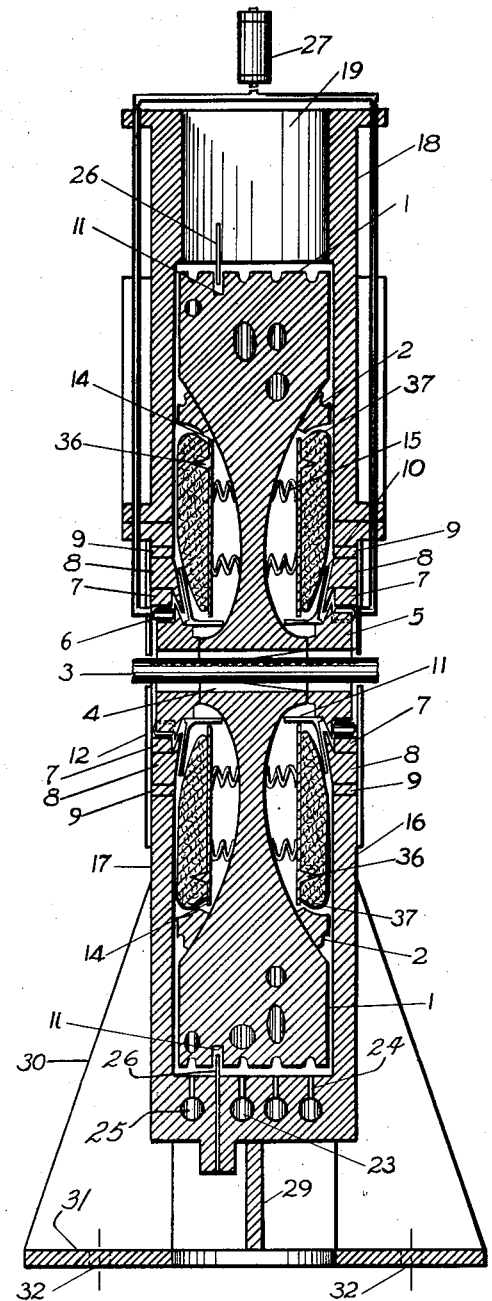
Fig. 2 is an elevation elevation transverse sectional view.

The object of this invention being to present a new type of steam turbine of unusually great power and speed of rotation for the purpose of driving the propellers of new types of marine vessels, and to adequately light these vessels, said steam turbine being of such structure as to be recognized as being, comparatively, very compact. The turbine being shown in Fig. 1, which is a front elevation view, is obviously comprised of a circularly formed case being supported on a supporting base formed by a circular plate 31, having as shown in Figs. 1, 2, 3, and 5, holes 32, four of said holes 32 being equidistantly placed and threaded to accommodate the fitting of adjusting screws which need not be shown, in that, said adjusting screws are without novelty, but are of distinct value in making fine adjustments of the elevation and position for proper alignment of said steam turbine, the supporting base being made structurally complete by members 29, and 30, being welded to plate 31 as shown in Figs. 1, 2, 3, and 5. The turbine having been properly aligned and connected with its functionally related machinery is made secure on its supporting base and in its proper position by welding the turbine case to the supporting members and by welding or bolting said supporting base to its foundation. As shown in Figs. 1, 2, 3, and 5, the circular case is comprised of sections 16, 17, and 18, said sections of said circular case being joined at their obviously partially circular flanged edges and those flanged edges 43, 44, and 45; case section 18, structurally including flange 43 as shown in Figs. 1 and 5, and said case section 18 structurally including the turbine's exhaust pipe 19 which as shown in Figs. 1, 2, and 5 is of elliptical shape in its transverse sectional view especially noticeable in Fig. 5, the top view of said turbine. It is shown in Figs. 1, 2, 3, and 5, that case section 16 besides its partially circular flanged edge structurally includes flange 44, and also steam admission pipe 20 which includes three separate steam admission tubes one of them being indicated as admission tube 22 in Fig. 3 where it is seen to be continuous with tube 23 shown also in Fig. 2. Steam entering the steam admission pipe expands into the pipe's included three steam admission tubes and thence into the turbine as shown in Fig. 3, where it is seen that steam exit apertures 24 allow the steam to expand into the steam receptors 1b, 1d, and 1f, of the turbine's high-speed rotor 1. A plurality of said steam exit apertures 24 are shown in Fig. 3. In that, there is a plurality of steam admission tubes 23, the advance driving torque force of said turbine rotor becomes very great. It may be noticed that the steam exit apertures are angularly positioned so that their center lines coincide with the longitudinal center lines of said rotor's steam receptors 1b, 1d, and 1f, shown in Fig. 4. The turbine's reverse driving section is shown in Figs. 1, 3, 4, 5, and 7, where steam admission pipe 21, of Figs. 1, 3, and 5, admits steam into tube 25 from which it issues in a manner similar to that of the turbine's advance driving section, into the rotor's steam receptors 1h, shown in Figs. 4 and 7 where it will be noticed that the longitudinal center lines of these steam receptors are directed opposite to those in the turbine's advance driving section, thereby an oppositely directed torque force is applied to the rotor, making it revolve in the direction opposite to that used in advance driving; the torque force being created by the admitted expanding steam pressure. When being practically utilized the turbine's advance driving section and reverse driving section is kept as free as possible from steam pressure while one section or the other section is being filled with steam to create one of the two possible functions, i. e., reverse driving or advance driving. It will be noticed that it is possible to create a much greater torque force for advance driving than for reverse driving, due to the difference in the number of steam receptors in the two sections of said rotor 1, shown in Figs. 2, 3, 4, 5, 6, and 7. Said advance driving and reverse driving turbine sections are inwardly made separate by the circular diaphragm 26, shown in Figs. 2 and 5; said diaphragm being fitted into the rotor's circumferential slot 1i, of Figs. 2, and 4. Tightness of fit between said diaphragm 26 and the bottom of said slot 1i, is established by making said diaphragm along its more central edge thick enough to fit the slot very closely, and adequate slippage between the diaphragm and slot is established by making the diaphragm material like that of self-lubricating bearings, i. e., graphite bronze. In order to make it possible to properly assemble said diaphragm into its proper position in the turbine it is cut into two pieces of equal size, then the two pieces are joined by welding after they are in proper position on the turbine rotor.

Figure 12:
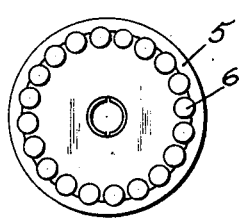
Figure 8:
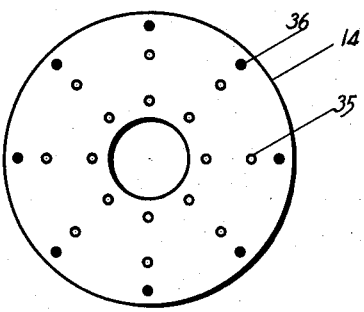
Fig. 8 is an elevation circumferential view, of an inner plate.
Figure 14:
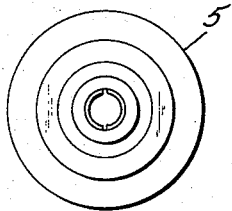
Figure 9:
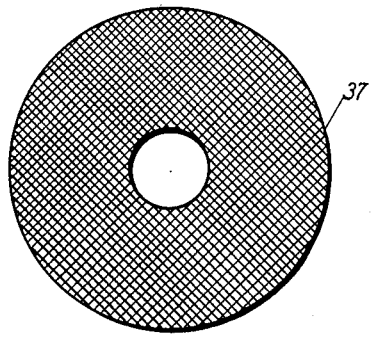
Fig. 9 is an elevation circumferential view of an inner cushion.
Figure 13:
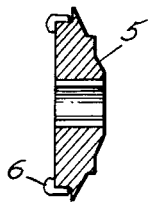
Figure 4:
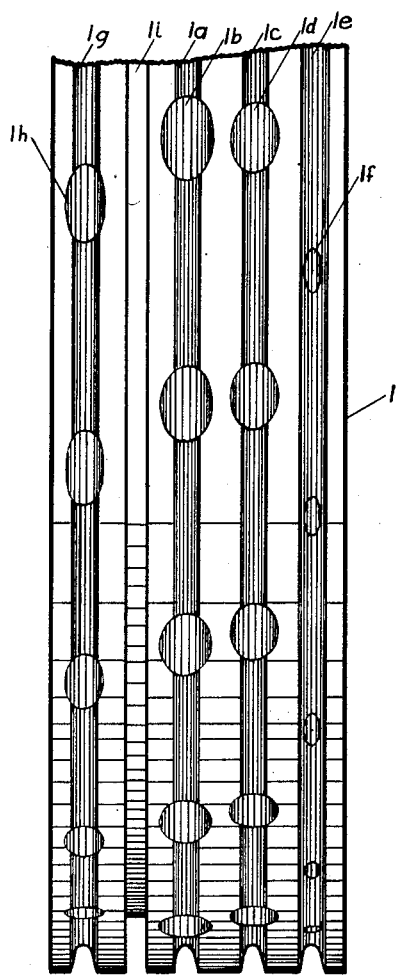
Fig. 4 is an elevation perimeter's surface view.
Figure 6:
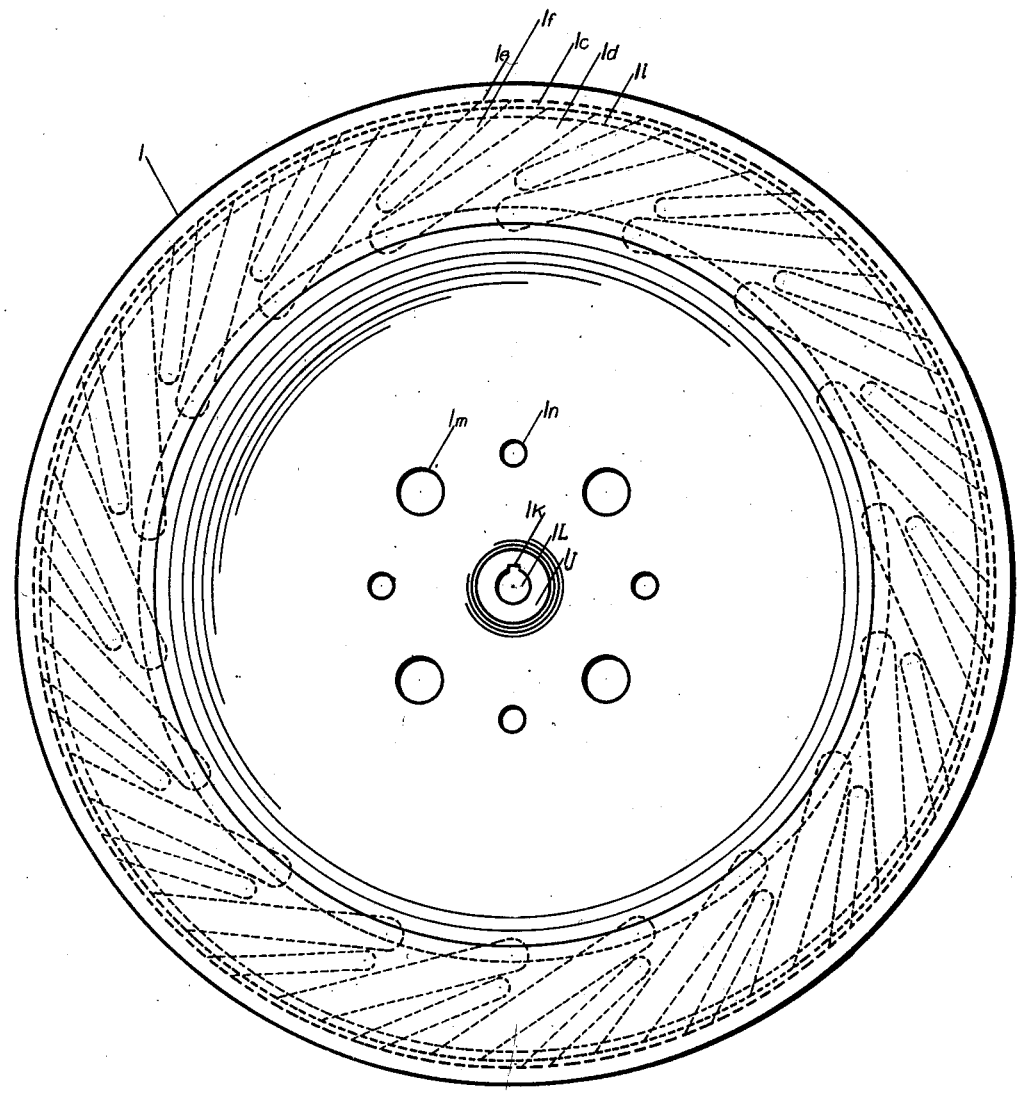
Fig. 6 is an elevation circumferential view.
Figure 7:
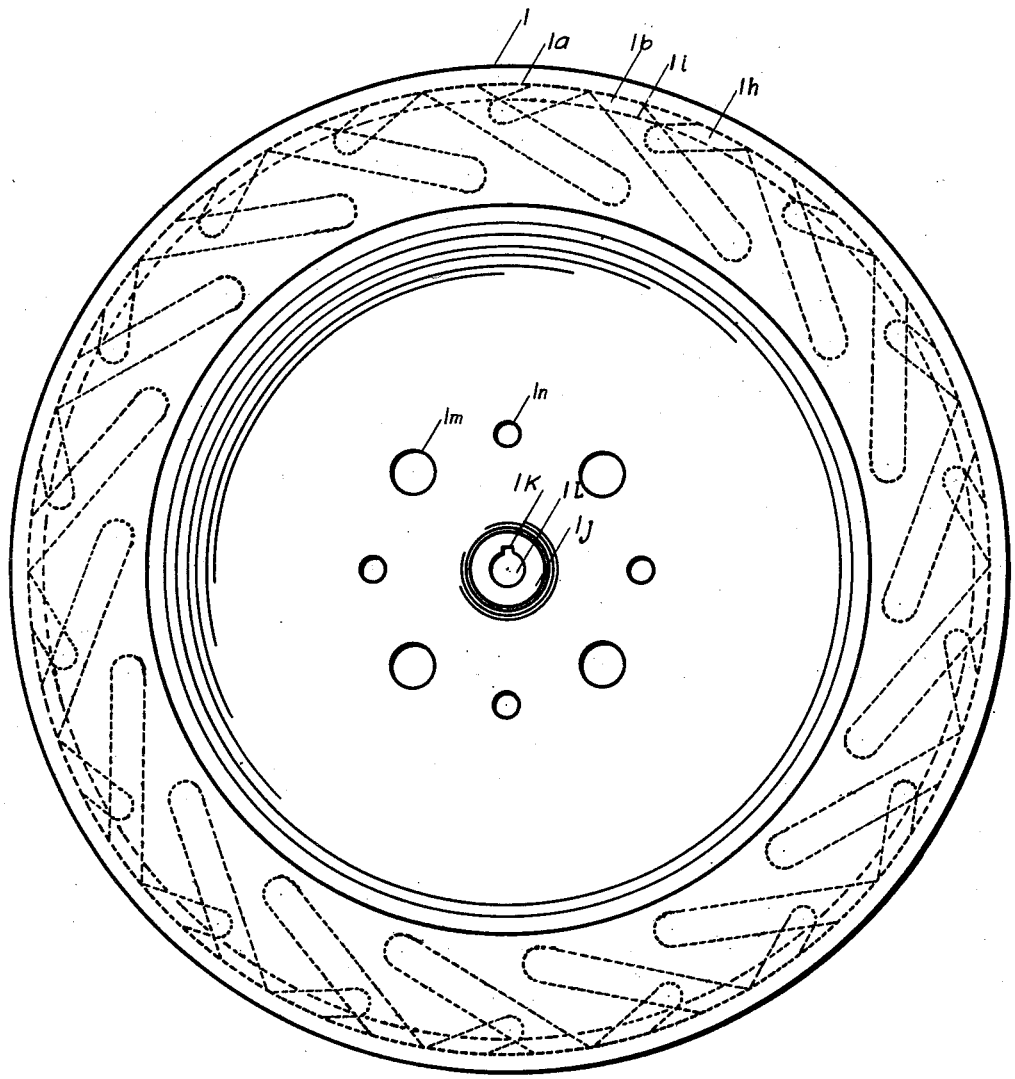
Fig. 7 is an elevation circumferential view.

In Figs. 1, 2, 3, and 5, it is seen that the flanged edges of case sections 16, 17, and 18, are in their assembled position, surmounted by pieces 28, and 33, which have a double service, one being to strengthen the flanged joint, and a second being to hasten the dissipation of heat from the turbine which in practical utilization will be occasionally using steam temperatures between 650° and 700° Fahrenheit. These heat dissipaters are welded in their positions on the flanged edges of the turbine case sections, and when said case sections are properly aligned in their assembled position the flanges being previously beveled in order to make a groove as shown between flanges 43, and 44, in Fig. 1, the joining of said flanged edges is made complete by welding; this method of joining being used to ensure sufficient strength to withstand an intra-turbine steam pressure of approximately 3100 pounds per square inch; the turbine rotor and turbine case being made of metal alloys of the corrosion and heat resisting type. Where comparatively low intra-turbine steam pressures are the only pressures used, said flanges may be made with numerous approximately equidistantly located holes and these holes fitted with bolts, washers and nuts; metal alloys being used to make all parts of turbine including the rotor axle and bearings which are adequately lubricated by the use of an oiling system indicated by structures 13 and 27, as shown in Fig. 1. Said turbine case sections 16, 17, and 18, as shown in Figs. 1, 2, and 3, and 5, are separate castings which include steam admission pipes 20, and 21, and the steam exhaust pipe 19 respectively, and said case section 16 includes three tubes made as herewith described and shown in Figs. 2 and 3; said case section 17 including tube 25 which extends from the position shown in Fig. 3 at 21 to a point approximately 190° therefrom in case section 17; these case sections and their tubular cavities and apertures are finished with smooth surfaces inwardly and on all surfaces of said flanged edges. Said turbine rotor steam receptors are finished with smooth surfaces. In Fig. 4 it is seen that the rotor's steam receptors are indented at their outermost ends by grooves 1a, 1c, 1e, and 1g, these grooves are finished with smooth surfaces and said grooves are made for the purpose of aiding in the maintenance of a high steam pressure within the steam receptors shown in Figures 3, 6, and 7. In Figs. 6 and 7, the turbine rotor 1, is shown to be made to include a plurality of lightening holes 1m, and 1n; these being made to increase the rotary kinetic energy of the rotor and to facilitate the assembling of structures 14 and 15 which are as shown in Figs. 2, and 8, circular perforated plates 14 and expansion springs 15, said perforated plates 14, being mounted near their perimeters by spikes 36; these structures being made integral with the rotor in the positions shown by Fig. 2, for the purpose of maintaining a pressure against the steam arresting cushion 37, shown in Fig. 9; this figure being very diagrammatic except in its proportionate dimensions revealed, in that, the cushion is made of a mixture of non-corrodable metallic wool, asbestos, graphite and grease. The perimeter of said steam arresting cushions as shown in Fig. 2, are closely approximated to stream arresting rings 2; these steam arresting rings being made of self-lubricating bronze and made to fit very closely to the inner surface of the turbine case. Said steam arresting rings and said steam arresting cushions together with said perforated plates backed by expansion springs 15, function to prevent the steam from issuing out of the turbine through small openings around the axle and bearings. The purpose of spikes 36, being to make the steam arresting cushion rotate with the turbine rotor 1; and the purpose of said springs 15, and plates 14 being to establish tightness between the steam arresting cushions 37 and the inner surfaces of the turbine case.

Figure 10:
Fig. 10 is an elevation circumferential view of a lubricant distribution controller.
Figure 11:
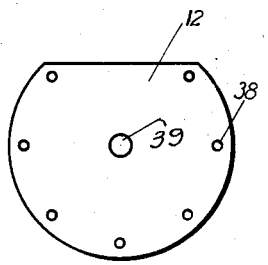
Fig. 11 is an elevation circumferential view of a faceplate.

The turbine's driving axle bearings 6 being in a plurality, with a plurality of them at each side of the rotor 1, are made of metal alloy with a high yield strength to withstand the weight of the high-speed rotor. The bearings 6 are cylindrically formed solids held in bearings holders 5, shown in Figs. 1, and 2, said bearings holders also being made of metal alloy to withstand the weight and pressure of the high-speed rotor. In Figs. 1, 2, and 3, it is shown that the bearings holders 5, and the rotor 1, are made secure on driving axle 3, by the use of locking keys 4, which as shown, fit into adapting key-slots of the joined structures; said locking keys 4, being made fixed in their proper positions by welding at their outer ends within said adapting slot of said axle. In Fig. 2, it is shown that inwardly located cylindrical structures 11, are attached to the bearings holders 5, and to these cylinders 11, are welded shields 10. The purpose of these cylinders and shields being to keep the steam arresting cushions in their proper positions. As shown in Figs. 1, and 2, the bearings 6, turn and sustain the weight of the rotor on case rings 7, which are closely fitted into rings 8, which inwardly have inward projections as shown in Fig. 2, these inward projections being made to aid in keeping the steam and steam arresting cushions entirely within the turbine. Also in Figs. 1 and 2, are shown rings 9, these are slip rings used for the purpose of making easier the proper finished alignments between the rotating and fixed parts of the turbine, i. e., if in assembling the turbine, a small amount of grinding is necessary to bring about the proper fit between the rotating and fixed parts of the turbine it is done on rings 9. When the proper fitting of these said parts is finished, rings 9 are carefully welded to rings 8 by the use of bronze welding metal which is comparatively easy to remove by chipping and grinding. These rings 9 are also carefully welded to the previously cast case sections 16 and 17; rings 7 and rings 8 being properly threaded and screwed together. When the proper fitting and fixing into proper alignment is finished, face plates 12, shown in Figs. 2 and 11, having holes 38, and the axle hole 39, are fitted into their places shown in Figs. 1 and 2, and these said face plates 12 are held in their places by the use of nuts screwed tightly onto the threaded studs 42; these studs 42 being welded into their places as shown in Fig. 1. Preceding the mounting into their places face plates 12, oil-distribution controllers 40, are slipped into their places on axle 3, between the inner surfaces of face plates 12, and the bearings holders 5 outer surfaces. Said oil distribution controllers 40, being shown in Fig. 10, have the function of preventing the bearings lubricating oil from easily flowing outside of the turbine. Said oil distribution controllers 40 are made of asbestos and wool pressed to make an asbestos and wool felt.

Said flanges 43, 44, and 45, when properly fitted and clamped together may utilize a greater plurality of heat dissipaters 33, than shown by Fig. 5. Changes, variations and modifications may be made in the invention, as fall properly within the scope of the specification and claims herewith printed.

I, the inventor, am aware that the herewith disclosed steam turbine is of such unique shape in its structure when considered in its entirely, and of such utility value, that it fulfills the requirements of patentability as set forth in R. S. 4886; 35 U. S. C. 31, under rule 47 of the Rules of Practice effective March 1, 1949, in the United States Patent Office; therefore, I claim:

1. A steam turbine comprising a plurlity of properly fitting parts, including a rotor including a proper radial moment and having cylindrical steam receptors formed in its periphery, inwardly ending in hemispherical concavities, said cylindrical steam receptors being traversed at the steam receiving ends by grooves, said rotor structurally including steam arresting rings, said rotor structurally including steam arresting cushions, said rotor being joined to a rotating drive axle, bearing holders, said bearing holders sustaining a plurality of bearings, said bearings functionally rotating within bearings sockets of said bearing holders, said rotor with said bearings being sustained upon and functionally rotating upon bearing case rings structurally contiguous with the lateral sections of a three sectioned turbine case, said three sections being flanged, said sections being joined at said flanged edges, said flanged edges being made structurally contiguous with a plurality of strengthening members and heat dissipaters providing said turbine with a means of properly utilizing high pressures of steam, the laterally positioned sections of case provided with steam admission chambers with a plurality of steam exit apertures, said turbine having an exhaust port extending upwardly from the top section of said case.

2. A steam turbine, comprised of a plurality of fitted parts, including a rotor, a three sectioned case surrounding said rotor, said rotor being fitted by the use of keys to a driving axle equipped with bearings holders and bearings, said bearings sustaining the weight of said rotor, said rotor centrally being made with a plurality of annular lightening recesses, said rotor centrally sustaining a plurality of axially extending springs inwardly welded to said rotor and outwardly welded to two perforated plates annular in shape and near the periphery on the outward surface having short spikes welded thereto, said spring supported annular plates being provided to maintain a continuous outward pressure against annular steam arresting cushions located in said recesses and sweeping the inner surface of said case, said cushions being made of metallic wool, graphite, grease and asbestos, said spikes being provided to make said cushions rotate with said rotor, said rotor being provided with two steam arresting rings closely fitted to the inner surfaces of said turbine case and approximated by said cushions.

References Cited in the file of this patent

UNITED STATES PATENTS

| | | |
|---|---|---|
| 849,699 | Roberts | Apr. 9, 1907 |
| 890,918 | Mayberry | June 16, 1908 |
| 901,385 | Rowan et al. | Oct. 20, 1908 |
| 1,021,562 | Thomas | Mar. 26, 1912 |
| 1,075,528 | Wilke | Oct. 14, 1913 |
| 1,235,201 | Hager | July 31, 1917 |
| 1,778,331 | McDowell | Oct. 14, 1930 |
| 1,975,705 | Znaniecki | Oct. 2, 1934 |
| 2,084,667 | Bell | June 22, 1937 |